United States Patent [19] [11] 4,279,093
Iddings [45] Jul. 21, 1981

[54] HUMANE ANIMAL TRAP

[76] Inventor: Paul J. Iddings, Box 217, Big Horn, Wyo. 82833

[21] Appl. No.: 88,069

[22] Filed: Oct. 24, 1979

[51] Int. Cl.³ .......................................... A01M 23/30
[52] U.S. Cl. ...................................... 43/81.5; 43/82; 43/93; 43/85
[58] Field of Search ...................... 43/85, 81, 81.5, 82, 43/88–93

[56] References Cited

U.S. PATENT DOCUMENTS

| 390,021 | 9/1888 | Hooker | 43/85 |
|---|---|---|---|
| 734,413 | 7/1903 | Foreman | 43/85 |
| 2,779,124 | 1/1957 | Transtrom | 43/85 |
| 3,512,296 | 5/1970 | Frost | 43/85 |
| 3,991,509 | 11/1976 | Frost | 43/93 |
| 4,146,990 | 4/1979 | Conibear | 43/88 |
| 4,177,600 | 12/1979 | Torkko | 43/93 |

Primary Examiner—Harold D. Whitehead
Assistant Examiner—K. Bradford Adolphson
Attorney, Agent, or Firm—Harvey B. Jacobson

[57] ABSTRACT

A first elongated base bar for disposition in a horizontal position is provided and a second elongated bar has one end pivotally anchored relative to one end of the base bar for angular displacement between a first upstanding cocked position disposed generally normal to the first bar and a second horizontal closed position closely adjacent and generally paralleling the first bar. A follower is loosely engaged with the aforementioned one ends of the bars and slidable therealong and spring structure is operably connected between the base bar and the follower strongly yieldingly biasing the follower along the base bar toward the other end thereof, whereby movement of the follower along the base bar from its one end to the other end will cause rapid swinging movement of the second bar from the first upstanding cocked position thereof to the second horizontal closed position thereof closely paralleling the base bar.

7 Claims, 4 Drawing Figures

U.S. Patent    Jul. 21, 1981    4,279,093
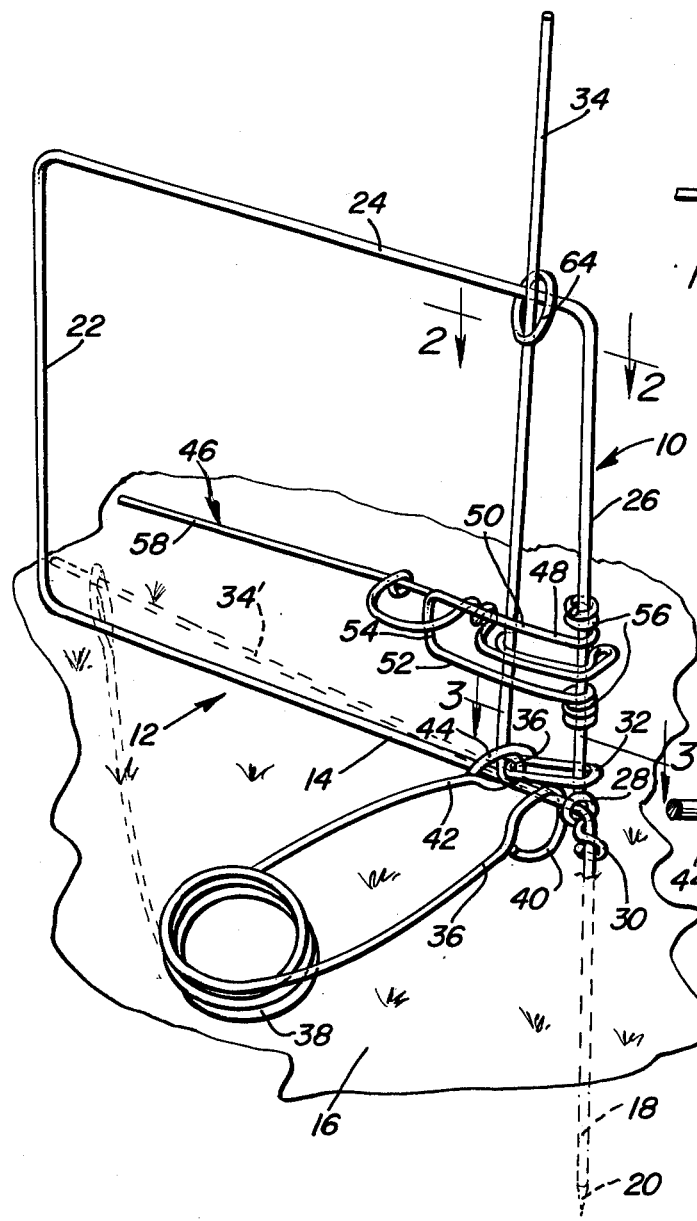
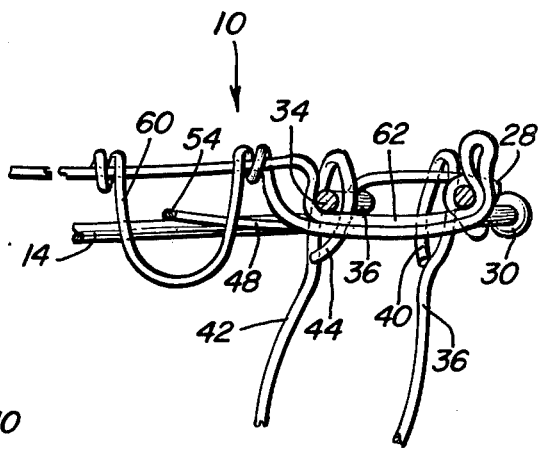
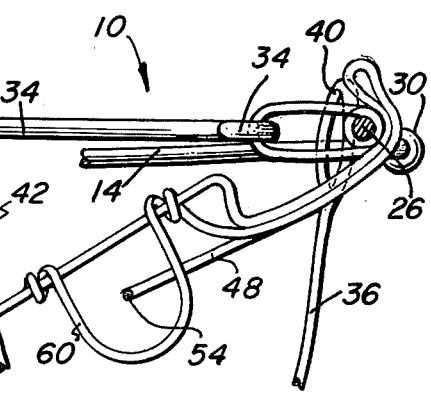
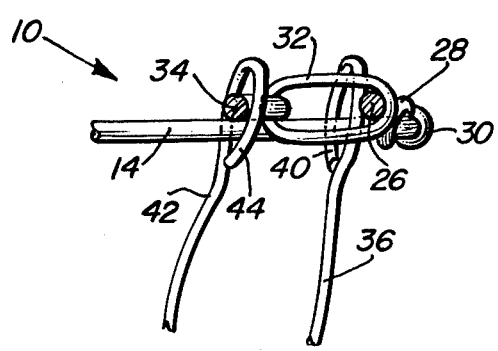

HUMANE ANIMAL TRAP

BACKGROUND OF THE INVENTION

Various forms of traps have been heretofore provided. Many of these traps are of the spring powered type and include structure for impaling or clamping a portion of an animal. However, many of these traps are constructed in a manner whereby non-critical body parts of the animal being trapped may be pierced or clamped in the trap with the result that many times these previously known forms of traps will severely injure non-critical body portions and therefore painfully, but not fatally, injure the trapped animal. Accordingly, a need exists for a humane animal trap constructed in a manner whereby the chances are extremely good that a killing force will be applied to any animal caught in the trap. Examples of previously known traps including some of the general structural and operational features of the instant invention are disclosed in U.S. Pat. Nos. 94,642, 191,052, 431,122, 612,798, 3,757,457 and 3,936,973.

BRIEF DESCRIPTION OF THE INVENTION

The trap of the instant invention is constructed with humanity as the prime feature thereof and the humanity aspect of the trap is accomplished by the provision of a movable clamp arm swingable relative to a stationary base arm as well as a spring structure operatively connected between the base arm and the clamp arm in a manner such that the biasing force of the spring structure swinging the clamp arm toward the base arm is substantially increased during the latter part of the movement of the clamp arm toward the base arm. Further, the trap is also constructed in a manner whereby the portion of the animal to be clamped between the base arm and clamp arm is forced toward seated engagement in a substantially right angle corner portion defined by the end of the base arm toward which the free end of the clamp arm is biased upon actuation of the trap and in this manner the clamping force of the clamp arm on the trapped animal is rendered more effective to inflict an instantaneous killing blow to the trapped animal.

The main object of this invention is to provide an improved animal trap which will be capable of trapping various forms of animals in a manner such that an animal trapped thereby will be quickly killed, at least in substantially all instances.

Another object of this invention is to provide an animal trap constructed substantially entirely of cylindrical rod-like material and which may therefore be readily manufactured at a low cost.

Still another important object of this invention is to provide an animal trap constructed in manner whereby the shiftable portion of the trap may be shifted to the cocked position thereof by a person desiring to use the trap and with little danger to the person setting the trap.

Yet another object of this invention is to provide a trap which may be readily ground mounted in substantially any location after having been set.

A final object of this invention to be specifically enumerated herein is to provide an improved animal trap constructed in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the trap with the clamp bar and trigger thereof in "cocked" positions;

FIG. 2 is a fragementary enlarged horizontal sectional view taken substantially upon the plane indicated by the section line 2—2 of FIG. 1;

FIG. 3 is an enlarged fragmentary horizontal sectional view taken substantially upon the plane indicated by the section line 3—3 of FIG. 1; and FIG. 4 is a fragmentary enlarged horizontal sectional view similar to FIG. 2 but with the trigger in a released position and the clamp arm of the trap in an intermediate position of swinging movement toward the base arm or bar of the trap.

DETAILED DESCRIPTION OF THE INVENTION

Referring now more specifically to the drawings, the numeral 10 generally designates the trap of the instant invention. The trap 10 includes a base structure referred to in general by the reference numeral 12 including a first base arm or bar 14 which is horizontally disposed and adapted to lie upon the surface of the ground 16 from which the trap 10 is supported. One end of the first bar or arm 14 terminates in a downwardly directed ground spike portion 18 adapted to be forced downwardly into the ground and provided with a lower pointed terminal end 20 for penetrating the ground 16. The other end of the base bar or arm 14 terminates in a right angularly and upwardly directed bar 22 and the latter terminates upwardly in a back turned horizontally directed bar 24. The bar 24 overlies and substantially parallels the base bar 14 and the end of the bar 24 overlying the ground spike portion 18 terminates in a downwardly directed bar 26 whose lower end is coiled once about the bar 14 as at 28 and thereafter coiled once about the upper end of the ground spike portion 18. Thus, the bars 14, 22, 24 and 26 define a one-piece rigid rectangular frame comprising the base structure 12.

The lower end of the bar 26 has a rigid anchor link 32 loosely anchored thereon and one end of a second clamp bar 34 or arm includes an integral eye 36 through which the anchor link 32 passes. The clamp bar or arm 34 is thus swingably supported relative to the base structure 12 for movement between the upright "cocked" position thereof illustrated in solid lines in FIG. 1 and a lowered horizontal position such as that illustrated in phantom lines as at 34' in FIG. 1 closely paralleling the base bar or arm 14.

One end 36 of a strong butterfly spring 38 has an eye 40 formed integrally therewith and the eye 40 encircles the bar 14 closely adjacent the portion 18. The other end 42 of the spring 38 includes an integral eye 44 loosely encircled about the base bar or arm 14 and the clamp bar or arm 34.

A trigger assembly generally referred to by the reference numeral 46 is provided and the trigger assembly includes a U-shaped mounting arm 48 including a pair of generally parallel legs 50 and 52 interconnected at one pair of corresponding ends by a bight portion 54. The ends of the legs 50 and 52 remote from the bight portion 54 are coiled loosely about the bar 26 as at 56 whereby the arm 48 is swingably supported from the bar 26 and the arm 48 may be slidably shifted along the bar 26. The trigger assembly 46 further includes a trigger arm 58 defining an integral U-shaped frame 60 intermediate its opposite ends and a laterally opening recess 62 at one end, the bight portion 54 passing loosely through the frame 60. Also, the trigger assembly 46 is supplemented by a latch ring 64 slidably mounted on the frame 12 and through which the clamp bar or arm 34 loosely extends.

Assuming that the trap 10 is in the "set" condition illustrated in FIG. 1 with the portion 18 embedded in the ground 16, it will be noted that the strong butterfly spring 58 has had its ends or arms 36 and 42 biased together and the clamp bar or arm 34 is in the "cocked" upstanding position. In addition, the trigger assembly 46 embracingly receives the lower end of the bar 26 and clamp bar or arm 34 within the recess 62 and thus retains the clamp bar or arm 34 in the upright position against the biasing action of the spring 38.

If it is desired, the ring 64, upon subsequent slight swinging of the upper end of the clamp bar or arm 34 further toward the upper end of the bar 26, may be slid along the bar 24 and from the latter onto the bar 26 whereupon the ring 64 will slide downwardly along the bar 26 and the bar 34 to latch the bar 34 in the upright position. However, when the ring 64 is positioned as illustrated in FIG. 1, it is inoperative and the engagement of the free end of the trigger assembly 46 spaced between the bars 22 and 26 by an animal will cause the heavily tensioned clamp bar or arm 34 to be disengaged from the recess 62 thus allowing the spring 38 to swing the clamp bar or arm 34 downwardly toward the phantom line position thereof illustrated as at 34' in FIG. 1. As the bar 34 swings toward the phantom line position thereof, the ring 64 slides along the bar 24 toward the bar 18 and then downwardly along the latter. In addition, as the clamp bar or arm 34 approaches the horizontal position 34' thereof, the eye 44 slides along both the bar 14 and the bar 34 and the spring enjoys considerable mechanical advantage in swinging the bar 34 through its final movement toward the phantom line position 34' thereof. The force imparted upon the clamp bar or arm 34 by the spring 38 during final movement of the bar or arm 34 to the phantom line position 34' thereof is considerable and, in addition, as the eye 44 slides along the bars 14 and 34, any portion of an animal engaged between the bars 34 and 14 will be engaged by the eye 44 and displaced toward the bar 22. Thus, final movement of the bar 34 toward the phantom line position 34' thereof is accompanied by movement of the eye 44 along the bar 14 toward the inside right angle corner defined between the adjacent ends of the bars 14 and 22 and the clamping action of the clamp bar 34 on an animal portion disposed within the aforementioned corner is thus further increased.

The ring 64 is provided to assist in "setting" the trap 10. Initially, the eye 42 is biased toward the eye 40 while the free end of the clamp bar or arm 34 is swung upwardly along the bar 22 toward the bar 24. Once the free end of the bar 34 is registered with the bar 24 and the eye 44 is engaged with the clamp bar 34 at a point only slightly spaced from the bar 36 manual force applied by the end of the clamp bar 34 remote from the eye 36 to swing the bar 34 toward the "cocked" position thereof is minimal. As the clamp bar 34 is swung to and slightly past the position thereof illustrated in solid lines in FIG. 1, the ring 64 slides down both the arm 34 and the bar 26 in order to latch the arm or bar 34 in the raised position. Thereafter, the trigger assembly may be manipulated and operatively associated with the bar 26 and also the bar 34 in order to latch the bar 34, independent of the ring 64 in the "cocked" position thereof illustrated in FIG. 2.

It is pointed out that substantially all of the components of the trap 10 are constructed of cyclindrical rod material. Conventional rod material may be utilized in the construction of all components of the trap 10, except for the spring 38. Of course, the spring 38 is constructed of stiff spring wire material.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An animal trap including a base structure defining a first elongated base bar, a second elongated bar having one end pivotally anchored relative to one end of said base bar for angular displacement between a first "cocked" position disposed at generally right angles relative to said base bar and a second "closed" position closely adjacent and generally paralleling said base bar, a follower loosely engaged with said one ends of said bars and slidable therealong, spring means operatively connected between said base bar and said follower yieldingly biasing said follower along said base bar toward the other end thereof, said base structure including a pair of uprights projecting upwardly from opposite ends of said base bar and an upper member interconnecting the upper ends of said uprights, a safety latch ring slidably mounted on said upper member and from the latter downwardly along each of said uprights, said second bar being slidably received through said latch ring.

2. The combination of claim 1 wherein said base structure includes a depending ground spiked portion adjacent said one end of said base bar.

3. An animal trap including a base structure defining a first elongated base bar, a second elongated bar having one end pivotally anchored relative to one end of said base bar for angular displacement between a first "cocked38 position disposed at generally right angles relative to said base bar and a second "closed" position closely adjacent and generally paralleling said base bar, a follower loosely engaged with said one ends of said bars and slidable therealong, spring means operatively connected between said base bar and said follower yieldingly biasing said follower along said base bar toward the other end thereof, said base structure including a pair of uprights projecting upwardly from opposite ends of said base bar and an upper member interconnecting the upper ends of said uprights, a combined trigger and latch operatively connected between said base bar and said second bar releasably retaining said second bar in said first "cocked" position, said trigger and latch comprising an elongated arm defining an outwardly opening recess on one end in which said clamp bar and the upright adjacent said one end of said base bar are received, a safety latch ring slidably mounted on said upper member and from the latter downwardly along each of said uprights, said second bar being slidably received through said latch ring.

4. The combination of claim 3 wherein said spring means comprises a butterfly spring including a pair of free arm end portions, one of said arm end portions being anchored relatively to said one end of said base bar and the other arm end portion of said spring including means slidably engaging said base bar and second bar.

5. An animal trap including a first base elongated bar adapted to parallel and overlie a ground surface, a pair of uprights projecting upwardly from opposite end portions of said base bar, an upper member extending and connected between the upper end portions of said uprights, a second elongated bar having one end pivotally anchored relative to one end of said base bar for angular displacement between a first "cocked" position generally paralleling one of said uprights and disposed at generally right angles relative to said base bar and a second "closed" position closely adjacent and generally paralleling said base bar, a follower loosely slidingly engaged with said base bar and second bar at said one ends for sliding movement along said base and second bars toward the other end thereof, spring means operatively connected between said base bar and said follower yieldingly biasing said follower along said base bar toward the other end thereof, a combined trigger and latch operatively connected between one upright and said second bar intermediate its opposite ends releasably retaining said second bar in said first "clocked" position, said combined trigger and latch being supported from said one upright and engaged with said second arm for shifting along said one upright and second arm a safety latch ring slidably mounted on said upper member and from the latter downwardly along each of said uprights, said second bar being slidably received through said latch ring.

6. The combination of claim 5 wherein said spring means comprises a butterfly spring including a pair of free arm end portions, one of said arm end portions being anchored relative to said one end of said base bar and the other arm end portion of said spring including means slidably engaging said base bar and second bar.

7. The combination of claim 5 wherein said base structure includes a depending ground spiked portion adjacent said one end of said base bar.

* * * * *